United States Patent [19]
Gautier et al.

[11] Patent Number: 5,634,337
[45] Date of Patent: Jun. 3, 1997

[54] ASSEMBLY OF A PNEUMATIC BRAKE BOOSTER AND OF A MASTER CYLINDER

[75] Inventors: Jean Pierre Gautier; Ulysse Verbo, both of Aulnay-Sous-Bois; Miguel Perez Revilla, Argenteuil; Flavio Cobianchi, Drancy, all of France

[73] Assignee: AlliedSignal Europe Services Techniques, Drancy, France

[21] Appl. No.: 428,098

[22] PCT Filed: Apr. 25, 1995

[86] PCT No.: PCT/FR95/00537

§ 371 Date: May 4, 1995

§ 102(e) Date: May 4, 1995

[87] PCT Pub. No.: WO96/00669

PCT Pub. Date: Jan. 11, 1996

[30] Foreign Application Priority Data

Jun. 29, 1994 [FR] France .................... 94 08031

[51] Int. Cl.$^6$ ........................................ B60T 13/20
[52] U.S. Cl. .................... 60/554; 60/594; 60/403; 92/129; 180/271
[58] Field of Search .................... 60/547.1, 552, 60/553, 554, 594, 403; 92/129; 180/274

[56] References Cited

U.S. PATENT DOCUMENTS

| | | | |
|---|---|---|---|
| 2,395,223 | 2/1946 | Ingres | 60/594 |
| 3,065,603 | 11/1962 | Randol | 60/553 |
| 4,354,353 | 10/1982 | Laue | 60/554 |
| 4,506,592 | 3/1985 | Shimamura | 92/129 |
| 4,785,628 | 11/1988 | Myers | 60/547.1 |
| 4,815,293 | 3/1989 | Cadeddu | 92/129 |

*Primary Examiner*—F. Daniel Lopez
*Attorney, Agent, or Firm*—Leo H. McCormick, Jr.

[57] ABSTRACT

An assembly of a pneumatic brake booster (100) and a master cylinder (200) for a motor vehicle. The pneumatic brake booster (100) has a casing (20) fixed to the bulkhead (10) of the vehicle. The casing is divided in leaktight fashion by a movable wall structure (22) into a front chamber (24) permanently connected to a source of partial vacuum and a rear chamber (26) connected selectively to the front chamber (24) or to the atmosphere by a valve means (16). The valve means (16) is actuated by a control rod (14) for actuating a push rod (28). The master cylinder (200) has a body (21) formed with at least first and second flanges (38, 38'; 40, 40'). The first and second flanges (38, 38'; 40, 40') interact with corresponding screws and nuts to fix the body (21) with the casing (20) of the booster (100). The body (21) has a bore (34) for slidingly receiving at least one piston (32) which is actuated by the push rod (28) of the brake booster (200). Linkage (60, 60') is provided so that a rotation of the master cylinder (200) with respect to the booster (100) in response to a rotational torque applied to the master cylinder (200) as a result of being pushed substantially breaks the mechanical link between the piston (32) of the master cylinder (200) and the push rod (28) of the booster (100).

12 Claims, 5 Drawing Sheets

ASSEMBLY OF A PNEUMATIC BRAKE BOOSTER AND OF A MASTER CYLINDER

The present invention relates to braking assemblies made up of pneumatic boosters and master cylinders, of the type of those which are used to boost the braking of motor vehicles.

Pneumatic boosters conventionally include a casing fixed to a wall separating a passenger compartment from a front compartment of the vehicle, and divided in leaktight fashion by a movable wall structure into a front chamber permanently connected to a source of partial vacuum and a rear chamber connected selectively to the front chamber or to the atmosphere by a valve means actuated by a control rod capable of bearing, by means of the front face of a plunger, on the rear face of a reaction disk secured to a push rod.

In parallel with this, master cylinders conventionally include a body formed with at least two flanges for fixing the master cylinder onto the casing of the booster, each flange interacting with a screw and a nut, at least one piston sliding in a bore formed axially in the body of the master cylinder so that the push rod of the booster interacts with the piston of the master cylinder when the control rod of the booster is actuated.

Many documents illustrate this type of braking assembly. They are usually located in the front compartment of a motor vehicle, generally containing the engine of the vehicle, the booster being fixed via its rear wall onto the separating bulkhead between this front compartment and the passenger compartment, and the master cylinder being fixed to the front wall of the booster. The control rod of the booster passes through an opening in the bulkhead and it is actuated by a brake pedal in the passenger compartment.

In the event of a frontal or almost-frontal collision of the vehicle with another vehicle or with a stationary obstacle, the structure and bodywork of the vehicle are designed to deform progressively in order to absorb the greatest possible amount of the energy involved in this collision.

It is nevertheless often the case that the engine, or the load transported in the front compartment of the vehicle, moves back under the effect of such a collision and interferes with the master cylinder. Such an interference may result in the application to the master cylinder of a force directed along its axis, or a force forming a certain angle with its axis. The result, however, is that in all cases the master cylinder, by means of its fixing flanges, pushes the casing of the booster back towards the bulkhead of the vehicle, and by means of its piston, pushes back the push rod and therefore the control rod of the booster which is coaxial with it.

It therefore follows that the consequence of a frontal or almost-frontal collision, owing to the arrangement of the booster/master cylinder assembly in the front compartment of the vehicle, firstly causes the bulkhead to move back under the action of the casing of the booster, this being all the more intense if the booster is equipped with tie rods, and also causes the brake pedal to move back, this moving further if the booster/master cylinder assembly was being actuated at the moment of the collision, that is to say if a high pressure was prevailing inside the master cylinder, these two effects adding together and being capable of giving rise to substantial injuries to the driver of the vehicle.

Various documents have already attempted to provide a solution to this problem. The document FR-A2,437,337, for example, makes provision for the sector of bulkhead placed above the space where the driver places his feet to be situated as close as possible to the steering, and for the front sector of bulkhead to extend forward as far as a stationary articulation point provided in the front compartment, to which point is fixed a support intended to receive a braking assembly as defined above, this support being shaped and arranged so that it can pivot about this stationary articulation point under the effect of a substantial thrust.

The document FR-A-2,482,547 for its part makes provision for fixing the booster to the upper element of an impact-absorbing structure, the axis of the brake pedal being mounted at the top of the upper element which, by means of a cut-out, ends at a larger and deformable lower element connected to the bulkhead, the lower element being shaped so that at its upper part, the deformation travel available is greater than at its lower part.

These two documents of the prior art therefore essentially envisage the same solution, namely of interposing a tilting or deformable structure between the booster and the bulkhead in order to absorb the energy generated during the collision. Such a solution however exhibits a substantial drawback in the case of the front compartment constituting the engine compartment of the vehicle. In effect, in this case, the complexity of modern engines, along with the motor vehicle manufacturer's desire for compact vehicles, mean that there is very little or no space available in this engine compartment for locating additional equipment therein.

The object of the present invention is therefore to solve this problem by proposing a braking assembly made up of a pneumatic booster and of a master cylinder, each being of the type recalled above, this assembly being such that an interference of the engine or of the load transported in the front compartment of the vehicle with the master cylinder does not result in the brake pedal being projected toward the driver of the vehicle, and this being without making use of additional elements which would extend the axial length of the braking assembly forward of the bulkhead.

To this end, according to the present invention, means are provided so that a rotation of the master cylinder with respect to the booster under the effect of a rotational torque applied to the master cylinder when the latter is pushed substantially, breaks the mechanical link between the piston of the master cylinder and the push rod of the booster so as to eliminate the direct transmission to the bulkhead, and particularly to the brake pedal, of the forces resulting from the collision and which are the cause of the pushing of the master cylinder.

The rotation of the master cylinder may be brought about directly by the pushing of the latter when this pushing generates forces which are not directed along the axis of the master cylinder. In contrast, when the forces pushing the master cylinder are directed along its axis, the present invention advantageously provides means for converting, under these conditions, the pushing forces into a rotational torque on the master cylinder, so that this rotational torque can break the direct mechanical link between the master cylinder and the brake pedal.

Preferably, the flanges for fixing the master cylinder to the booster are asymmetric, and provision may advantageously be made for one of the fixing flanges to be situated outside of the casing of the booster and for the other fixing flange to be situated inside the casing of the booster, in order to orientate such a rotation of the master cylinder in a predetermined direction.

Figure 1:
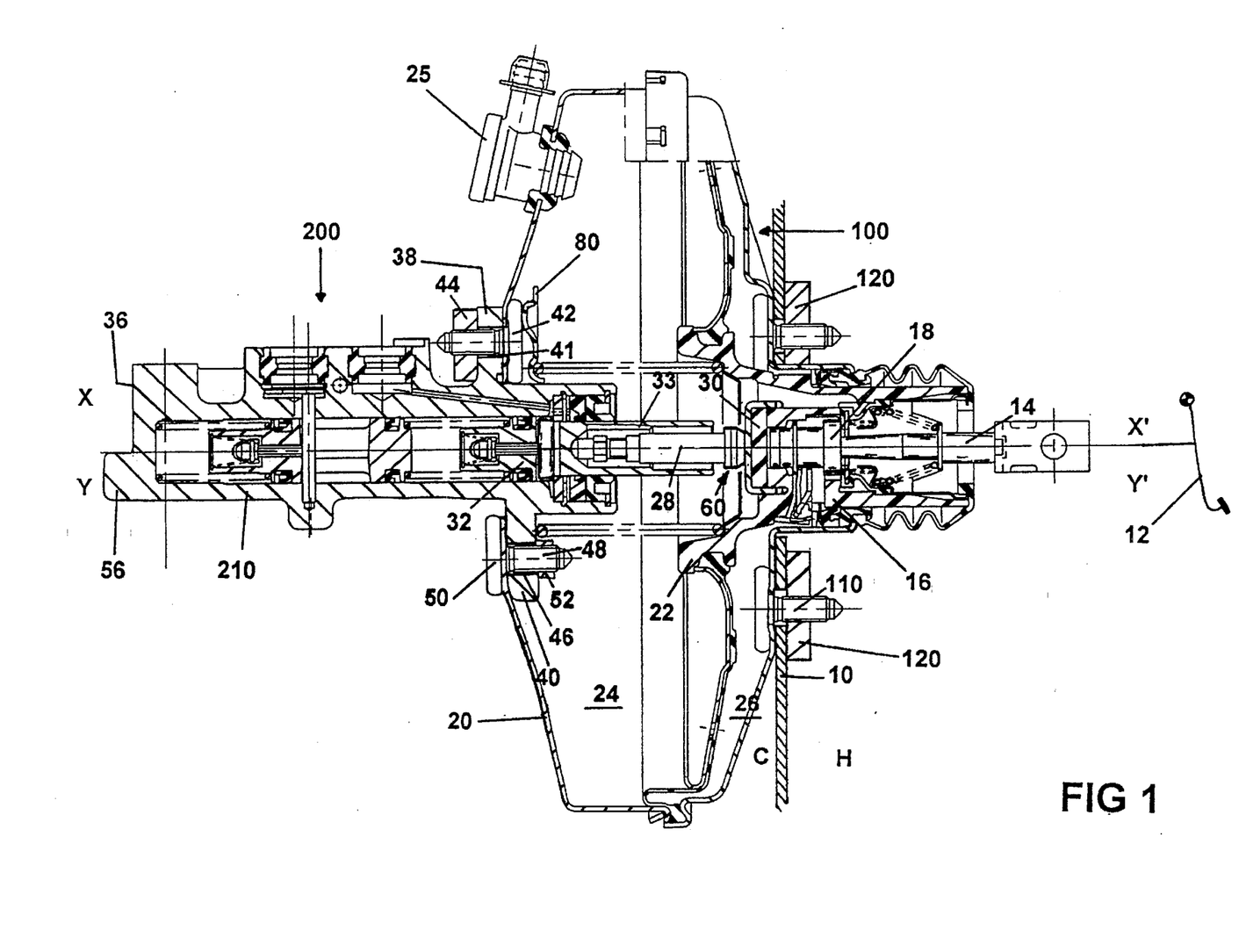
FIG. 1 represents a sectional view through an assembly made up of a pneumatic brake booster and of a master cylinder produced in accordance with the present invention.

Other objects, features and advantages of the present invention will emerge more clearly from the description which follows of one embodiment given by way of illustration with reference to the appended drawings in which:

FIG. 1 represents a sectional view through a braking assembly made up of a pneumatic brake booster denoted overall by the reference 100, and of a master cylinder denoted overall by the reference 200.

The booster 100 is designed to be fixed in the usual fashion by means of screws 110 and nuts 120 onto a separating bulkhead 10 between a front compartment C of a vehicle and the passenger compartment H of this vehicle and to be actuated by a brake pedal 12 situated in this passenger compartment. The master cylinder 200 controlling the hydraulic braking circuit of the vehicle includes a body 210 designed to be fixed to the booster 100, in the way which will be described later.

By convention, the part of the booster pointing toward the master cylinder 200 is termed "front", and the part of this assembly pointing toward the brake pedal 12 is termed "rear". In the figures, the front is therefore to the left and the rear to the right.

The booster 100 includes a casing 20, the interior volume of which is divided in leaktight fashion by a movable wall structure 22 into a front chamber 24 permanently connected to a source of partial vacuum (not represented) by a fitting 25 usually equipped with a non-return valve, and a rear chamber 26. The brake pedal 12 is connected to a control rod 14 of the booster 100 which actuates a three-way valve 16 by means of a plunger 18.

When the valve 16 is at rest, it places the chambers 24 and 26 in communication, and when it is actuated it isolates the chambers 24 and 26 from one another and places the rear chamber 26 in communication with the outside atmosphere. A difference between the pressures exerted on the two faces of the movable wall 22 is therefore created, which generates on this wall structure a boost force which is transmitted to a push rod 28 by means of a reaction disk 30.

The reaction disk 30 subjected via the front face of the plunger 18 to the actuation force of the input rod 14 and via the central part of the movable wall 22 to this boost force, transmits the sum of these two forces to the push rod 28 which interacts with a piston 32 sliding in a bore 34 formed in the body 210 of the master cylinder 200 in order to cause the pressure in the brake circuit (not represented) to which this master cylinder is connected, to rise. The rear end of the piston 32 forms a sleeve 33 which surrounds the front end of the push rod 28, in order to provide mutual guidance of these two components.

In this example, which corresponds to the arrangement most commonly used, the axis Y–Y' of the bore 34 of the master cylinder 200 is coincident with the axis X–X' of the booster 100, corresponding to the common axis of the control rod 14 and that of the push rod 28. It can therefore easily be seen that the master cylinder 200 forms a projection perpendicular to the bulkhead, and the front end 36 of which is situated at a significant distance from the bulkhead, reaching 40cm, for example.

It can therefore be understood that this end 36 is all the more likely, in the event of a collision of the vehicle, to be knocked violently by a piece of the engine or by an element of the load transported in the compartment C.

Such an impact is passed on in full, on the one hand, by the body 210 of the master cylinder to the casing 20 of the booster and by this casing to the bulkhead 10 and, on the other hand, by the piston 32 to the push rod 28, the reaction disk 30, the plunger 18, the control rod 14, and finally to the brake pedal 12.

The present invention avoids this drawback. As represented in FIG. 1, the body 210 of the master cylinder 200 is formed with two flanges 38 and 40. The flange 38 is identical to one of the conventional fixing flanges of the master cylinder, and includes an opening 41 through which there passes the shank of a screw 42, the head of which is situated inside the casing 20 of the booster 100, a nut 44 being screwed onto the shank of the screw 42 in order to fix the flange 38 onto the casing of the booster.

The flange 40, on the other hand, is situated inside the casing 20, and it includes an opening 46 situated 180degrees from the opening 41 with respect to the axis X–X'. Through this opening 46 there passes the shank of a screw 48 of which the head 50 is situated outside the casing 20, a nut 52 being screwed onto the shank of the screw 48 in order to fix the flange 40 inside the casing 20.

Figure 2:
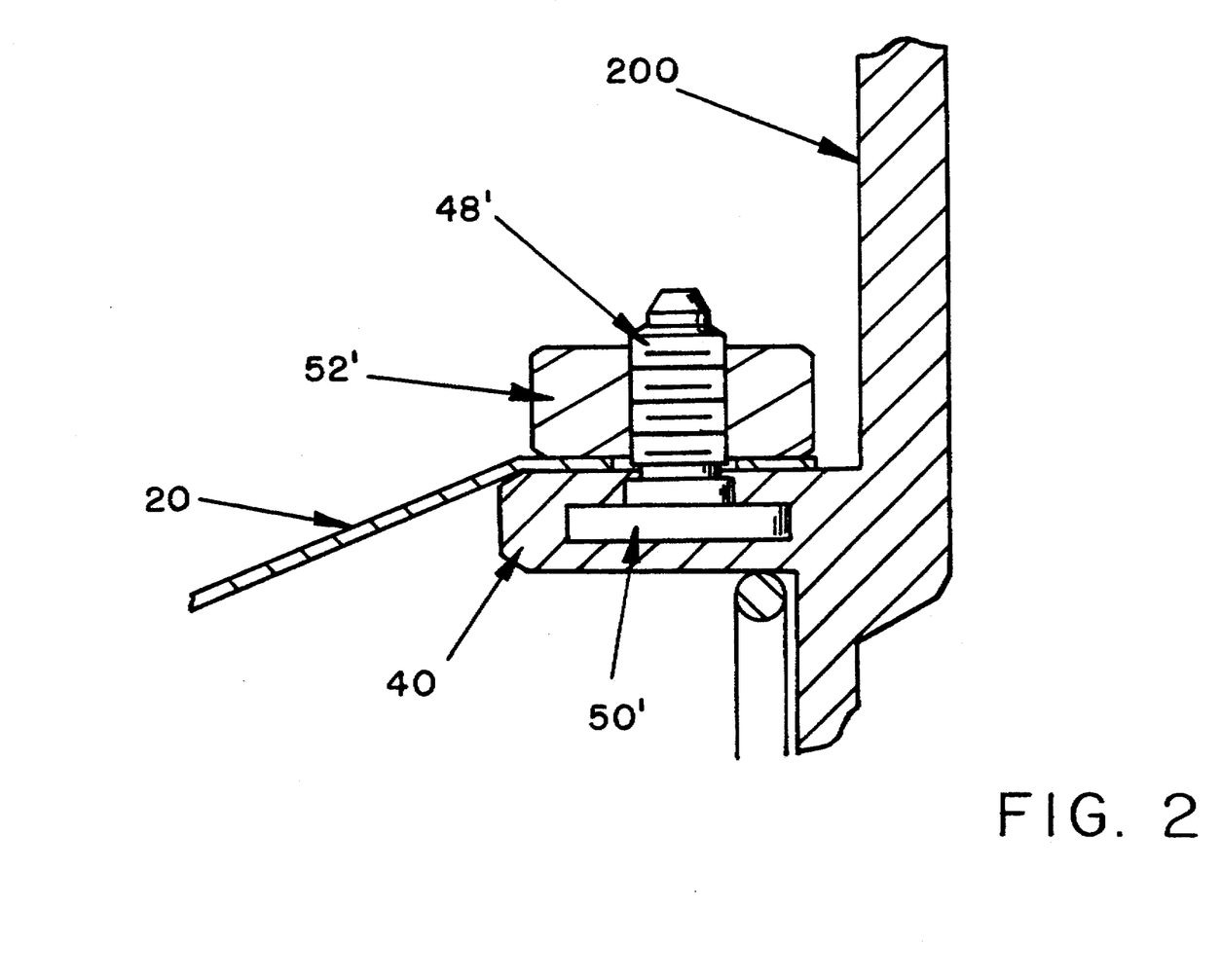
FIGS. 2 to 8 represent sectional views of several variants of the embodiment of FIG. 1.

In FIG. 2 is represented a variant embodiment of the flange 40. According to this variant, the shank of the screw 48' is integral with the flange 40, and it extends towards the front of the flange 40. The head 50' of the screw 48' may equally well be embedded in the flange 40, like an insert. A nut 52' may then be screwed onto the screw 48' from outside the casing of the booster when the master cylinder is assembled onto the booster.

In the event of a frontal or almost-frontal collision of the vehicle thus equipped, the force generated by a component of the engine or element of the load transported in the front compartment C interfering with the front end 36 of the master cylinder 200 will be transmitted, on the one hand, by the flange 38 onto the front face of the casing 20 of the booster 100 and, on the other hand, by the flange 40 onto the nut 52 or 52'.

The nut 52 or 52' is produced so that it gives under the action of such a force. In effect, during normal use of the booster/master cylinder assembly, the forces involved have the effect of permanently applying the flange 40 onto the rear face of the casing 20. These forces result from the action of a spring 52 for returning the movable wall 22 to the rear position and bearing on the flange 40, and also result from the actuation of the master cylinder by the booster.

The normal function of the nut 52 or 52' is to keep the master cylinder on the booster during the assembly, handling and storage of this assembly. It may therefore be produced so as to break easily in the event of a collision, either it includes a break initiator, or it is made up of material which is not very strong such as pressed sheet metal or made of a thermoplastic for example Nylon (trademark).

It is therefore easily understood that a significant pushing of the master cylinder 200 toward the booster 100 resulting from a collision of the vehicle will have the effect of making the flange 38 bear on the casing 20 of the booster, and of releasing the fixing of the flange 40. The master cylinder 200 can thus pivot about the flange 38, the flange 40 penetrating into the booster.

The action of the master cylinder 200 on the casing 20 of the booster 100 is therefore no longer composed of axial forces directed toward the rear, but is converted into a rotational torque on the master cylinder with respect to the booster.

It follows that the action of the flange 38 is to deform the part of the casing of the booster to which it is fixed, and that the action of the piston 32 of the master cylinder 200 is to apply a torque to the push rod 28 of the booster 100 by means of the sleeve 33, which torque will tend to deform this rod.

On the other hand, a projection or protuberance 56, away from the axis Y–Y' of the master cylinder, on the flange 40 side, could be formed on the front end 36 of the master cylinder in order to privilege the direction of rotation of the latter about the flange 38 as soon as the master cylinder starts to be pushed.

The invention makes provision for interrupting the link formed by the push rod or for uncoupling the piston of the master cylinder from the push rod at the same time as the master cylinder starts to rotate with respect to the booster in order, on the one hand, to prevent the brake pedal from being projected toward the rear and the risk of it injuring the driver of the vehicle at this moment, and, on the other hand, in order to facilitate the rotation of the master cylinder.

Figure 3:
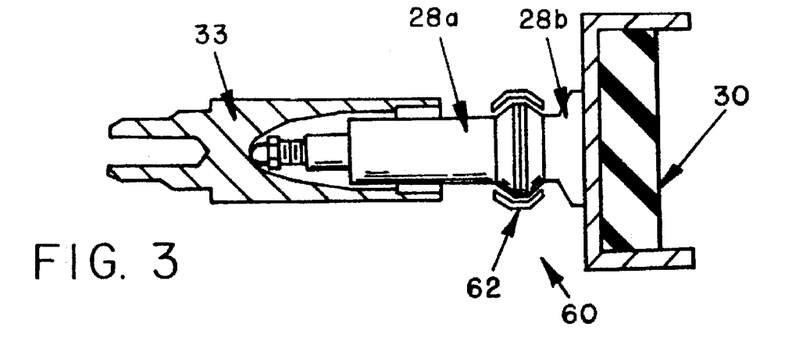

According to the invention, the push rod 28 of the booster is formed in two coaxial parts 28a and 28b, as represented in more detail in FIG. 3. These two parts have planar end faces which are opposite each other and perpendicular to the axis X–X', and they are joined together by a linking device 60 which, in the example represented, includes a ring 62 surrounding the parts 28a and 28b and keeping them in contact. Preferably, a radial bead in the immediate vicinity of each terminal face will be formed at the rear end of the part 28a and at the front end of the part 28b so that the ring 62 can be crimped around these beads.

When the master cylinder is pushed toward the booster, the resulting rotational torque on the master cylinder is applied by the sleeve 33 of the piston of the master cylinder to the front part 28a of the push rod 28. The ring 62 of the linking device 60 is then subjected to substantial shear loading, and it is designed to give under such loading and thus allow the two parts 28a and 28b of the push rod to be separated. It is produced, for example, of thin sheet metal.

In that way, when a rotational torque is applied to the master cylinder, the loading transmitted to the push rod results in an uncoupling of the two parts 28a and 28b of the push rod, which advantageously allows the master cylinder to tilt still further with respect to the booster, until their respective axes are practically perpendicular to one another.

The element of the front compartment which had interfered with the master cylinder can then move back toward the bulkhead by the distance corresponding to the length of the master cylinder forward of the booster, without having any action either on the bulkhead or on the brake pedal.

Figure 6:
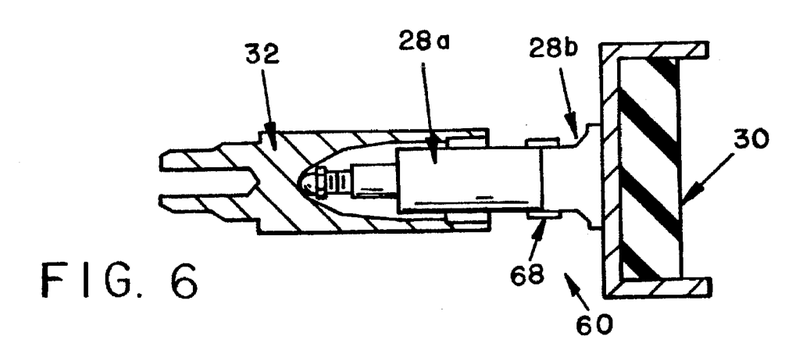

It is also possible to provide, as represented in FIG. 6, as linking device 60, a simple ring 68 in which the two parts 28a and 28b are forcibly fitted and bear on one another.

Figure 4:
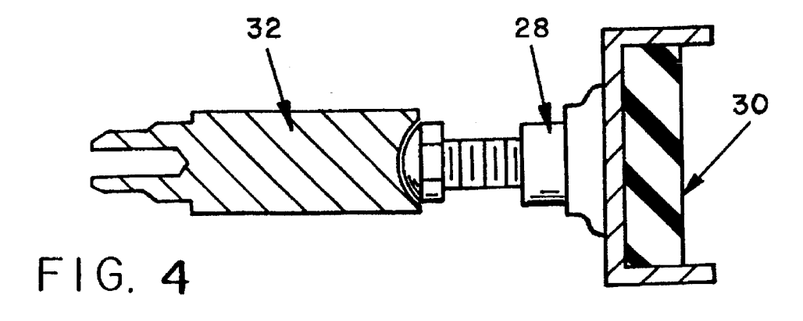
Figure 5:
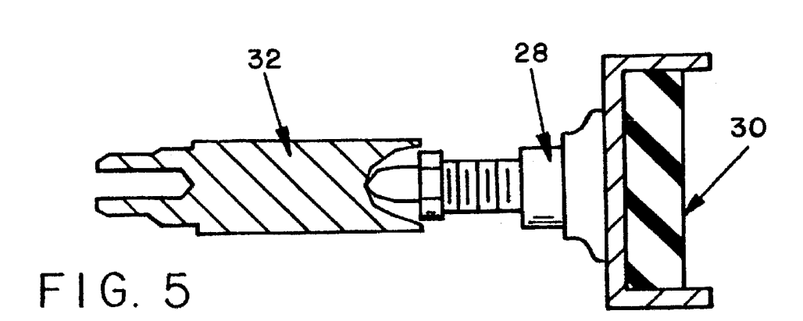

As represented in FIGS. 4 and 5 it is equally possible to make provision for the push rod 28 to bear quite simply on the piston 32 of the master cylinder, the rear end of which has a concave shape, for example conical with a rounded bottom, in order to ensure relative centering of the rod 28 and of the piston 32 during normal operation of the assembly. Thus, after the master cylinder has rotated through a certain angle depending on the vertex angle of the concave part of the piston 32, the push rod will be able to escape this concave part and allow an additional rotation of the master cylinder, as in the foregoing cases.

Figure 7:
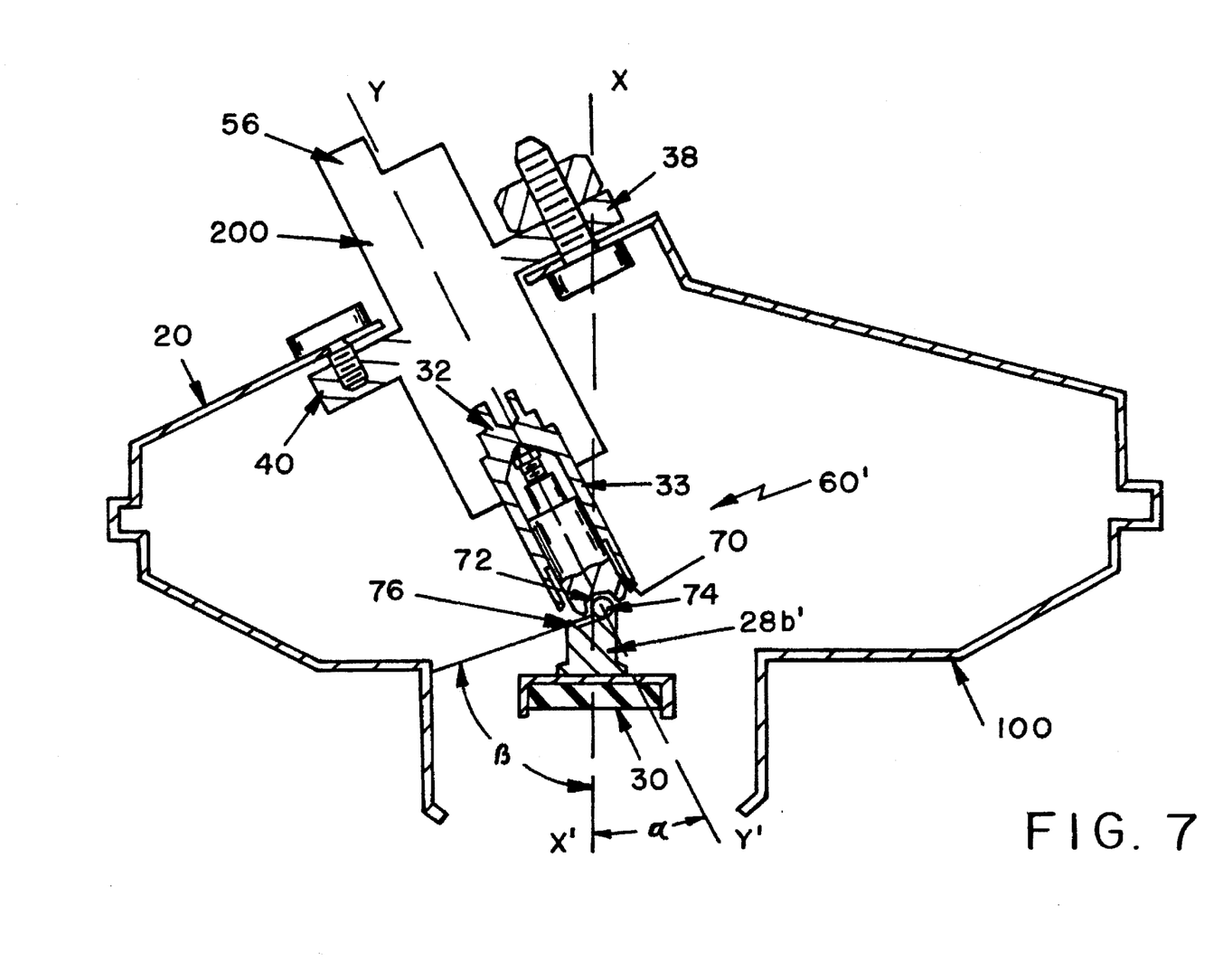

It is finally possible to make provision, as represented in FIG. 7, for the master cylinder 200 in its normal operating position to be given a position such that its axis Y–Y' forms a predetermined angle with the axis X–X' of the booster 100.

In order to do so, the push rod 28 is produced, as in the embodiments of FIGS. 3 and 6, in two parts 28a' and 28b'. The front part 28a' is held radially in the sleeve 33 of the piston 32 of the master cylinder 200 by a cylindrical spacer piece 70, and at its rear end it includes a housing 72 containing a ball or a roller 74 which is free to rotate in this housing 72. The rear part 28b' is formed at its front end with a planar face 76, forming an angle with the axis X–X' of the booster.

During normal operation of the booster/master cylinder assembly, the reaction disk 30 transmits the actuation force and the boost force to the rear part 28b' of the push rod so that the ball or roller 74 of the front part 28a' rolls without sliding over the front face 76 of the rear part 28b' in order to transmit these forces to the piston of the master cylinder in the manner of a wedge-type actuator. Through a judicious choice of the angles α and β it is possible to make sure that the travel of the part 28b' along the axis X–X' is equal to the travel of the part 28a' along the axis Y–Y'.

In contrast, in the event of a collision and of the consequences thereof, the pushing of the master cylinder will have the effect, possibly with the aid of the protuberance 56, of making the fixing of the flange 40 to the casing 20 of the booster 100 give, as described above. The asymmetric flanges 38 and 40 of the master cylinder are located such that the rotational torque applied to the master cylinder has the effect of increasing the angle.

This angle therefore has the effect that when the master cylinder begins to be pushed, the moment of the rotational torque which is applied to the latter has a non-zero value, and it thus makes it easier to make the master cylinder rotate. The ball or roller 74/inclined surface 76 assembly thus forms, as in the foregoing examples, a linking device 60' between the two parts 28a' and 28b' of the push rod 28, allowing these two parts to be separated when a rotational torque is applied to the master cylinder.

The embodiments which have just been described relate to the general case in which the pushing of the master cylinder following a collision is directed overall toward the rear, without this direction having a predefined orientation with respect to the axis of the master cylinder. The provisions described therefore have the purpose of converting this pushing into a rotational torque on the master cylinder, and of facilitating this rotation in order to break the mechanical link with the brake pedal.

There may, in contrast, be cases in which it is known in advance that a frontal or almost-frontal collision of the vehicle will have as consequences a pushing of the end of the master cylinder in a known direction, and not along the axis Y–Y' of the latter coincident with the axis X–X' of the booster, for example owing to the specific layout of the engine forward of the master cylinder or of the general design of the vehicle.

Figure 8:
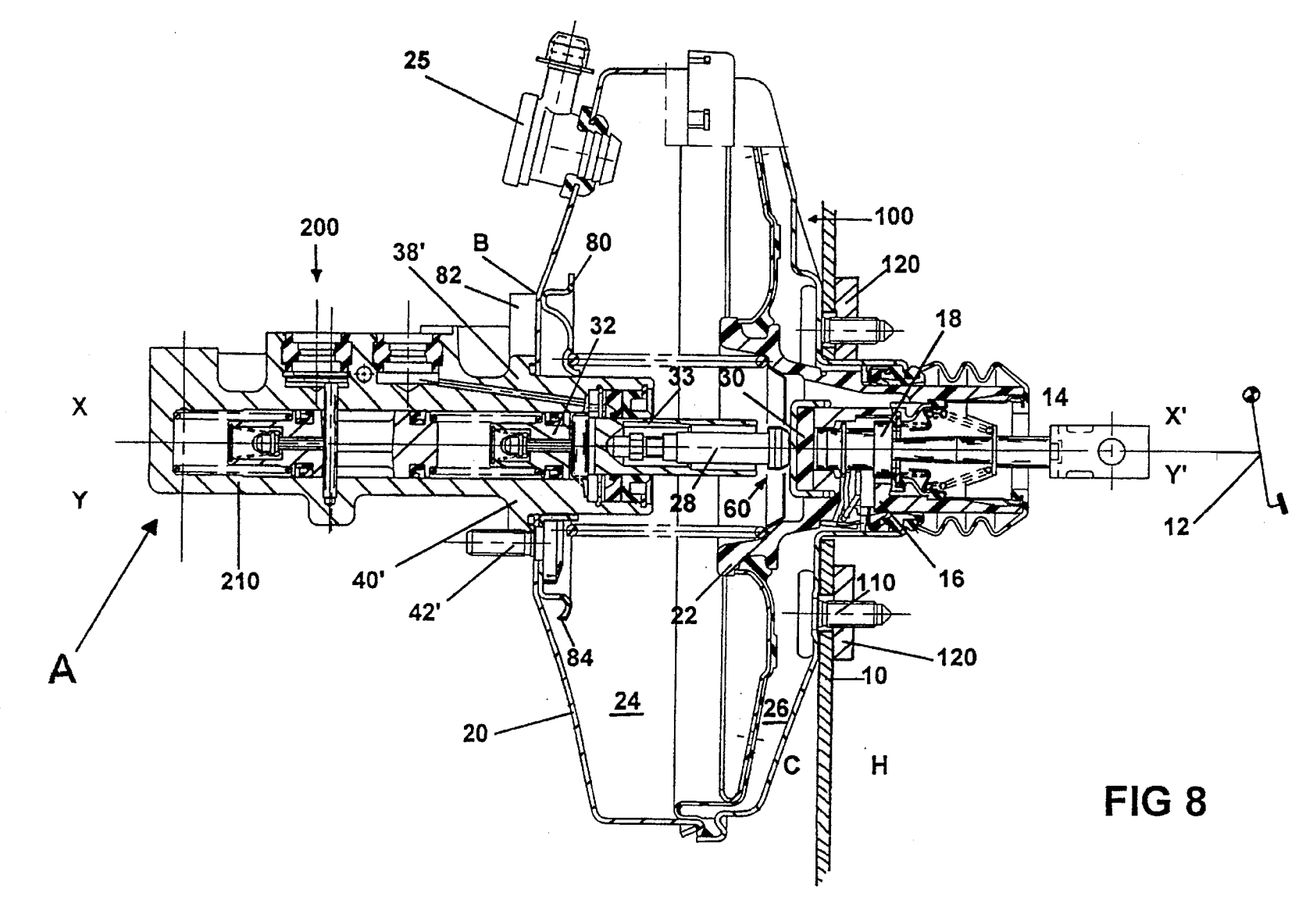

In these cases, recourse may be had to the variant embodiment represented in FIG. 8 in which it will be assumed that the pushing of the master cylinder will take place in the predetermined direction indicated by the arrow A. In this case, the protuberance 56 which no longer has a particular role to play may be omitted.

The fixing flange 38' is, as in the foregoing example, fixed from the outside onto the front face of the casing 20 with the aid of a screw (not represented) of which the head is situated inside the casing 20, and of which the shank passes through an annular reinforcement 80 located inside the booster, the casing 20 and the flange 38'.

The other flange 40' is analogous to one of the conventional fixing flanges of the master cylinder and it is fixed by a screw 42' of which the head is situated inside the casing 20 and of which the shank passes through the casing 20 and the annular reinforcement 80.

The body 210 of the master cylinder is formed with a radial extension 82, of which the rear face is situated in the same plane of the one containing the rear faces of the fixing flanges 38' and 40' and of which the radius with respect to the axis Y–Y' is equal to the outside radius, with respect to the axis X–X', of that part of the annular reinforcement 80 which bears on the internal wall of the casing 20, so that the casing 20 is trapped between the reinforcement 80 and the extension 82.

Thus, in the event of a collision and the subsequent pushing of the master cylinder in the direction of the arrow A, the rotational torque imposed on this master cylinder tends to cause it to tilt about the point B furthest from the axis X–X' of the extension 82, owing to the strength at this point of the casing 20 which has been stiffened by the reinforcement 80, the master cylinder 20 thus tending to separate from the booster 100.

Simultaneously, the rotational torque transmitted by the piston of the master cylinder and its sleeve 33 has the effect of causing the ring 62 or 68 of the linking device 60 to give or of making the push rod 28 leave the concave shape at the rear end of the piston 32.

The link between the piston of the master cylinder and the push rod of the booster therefore offers no obstacle to the rotation of the master cylinder about the point B which in turn, by means of its fastening screws, pushes that part of the reinforcement 80 which is diametrically opposite the one which is situated in the back of the extension 82 closer to the casing of the booster.

The invention advantageously makes provision for equipping the annular reinforcement 80, in its part diametrically opposite the one which interacts with the extension 82, with an aggressive portion 84, the function of which is to break or tear the casing 20 at this point, when the rotation of the master cylinder with respect to the booster has reached a certain angle under the effect of the torque which is applied to it, so as not to impede the rotational movement of the master cylinder, by breaking the link between the flange 40' and the rest of the casing of the booster.

It should be noted that the drawing of FIG. 8 corresponds to a general example in which the arrow A and the axis Y–Y' of the master cylinder define a different plane than the one which passes through the axis X–X' of the booster and which contains the axes of the openings for fixing the flanges of the master cylinder. In the particular case in which these two planes are coincident, the extension 82 may be formed on one of the fixing flanges 38' or 40'.

Of course, the invention is not limited to the embodiments which have been described, but can in contrast receive numerous modifications which will be obvious to the person skilled in the art. Thus, in the case in which the push rod is made in two parts forming an angle between them, the housing containing the ball or roller 74 may be formed at the front end of the rear part 28b' in order to interact with an inclined face 76 formed on the rear end of the front part 28a'.

We claim:

1. An assembly of a pneumatic brake booster of a motor vehicle and of a master cylinder, the booster including a casing fixed to a wall separating the passenger compartment from a front compartment of the vehicle, said brake booster having a casing which is divided in leaktight fashion by a movable wall structure into a front chamber permanently connected to a source of partial vacuum and a rear chamber connected selectively to said front chamber or to the atmosphere by a valve means actuated by a control rod, said control rod being capable of bearing, by means of a front face of a plunger on a rear face of a reaction disk secured to a push rod, said master cylinder including a body having an axial bore for receiving at least one piston and formed with at least first and second flanges, said first flange interacting with a first screw and first nut and said second flange interacting with a second screw and second nut for fixing said body with said casing to form a mechanical link between said piston of said master cylinder and said push rod of said booster, characterized in that said push rod of the booster includes at least first and second coaxial parts joined together by a sleeve which surrounds and retains said first part in contact with said second part to form said mechanical link, and means are provided so that with a rotation of said master cylinder with respect to said booster in response to a rotational torque developed when said master cylinder is pushed substantially breaks the mechanical link between said piston of the master cylinder and said push rod of the booster.

2. The assembly according to claim 1, characterized in that a front end of said push rod of the booster bears on a concave part formed at a rear end of said piston of the master cylinder.

3. The assembly according to claim 1, characterized in that said body of the master cylinder has a radial extension having a radius with respect to the axis of the master cylinder which is substantially equal to an outside radius of an annular reinforcement bearing on an internal wall of said casing of said booster.

4. The assembly according to claim 3, characterized in that said annular reinforcement includes a first part diametrically opposite a second part situated axially in a back of said radial extension, said first part having an aggressive portion which breaks or tears said casing of the booster when the rotation of the master cylinder with respect to the booster reaches a predetermined angle in response to rotational torque being applied to the master cylinder.

5. The assembly according to claim 1, characterized in that said flanges for fixing the master cylinder to the booster are asymmetric.

6. The assembly according to claim 5, characterized in that said first flange of said master cylinder is situated outside the casing of the booster and said second flange of said master cylinder is situated inside the casing of the booster.

7. The assembly according to claim 6, characterized in that said second nut which interacts with said second screw is capable of giving when the master cylinder is pushed significantly toward the booster.

8. The assembly according to claim 1, characterized in that said body of said master cylinder has a front end and a rear end, said second flange being located on said rear end while said front end includes a protuberance extending therefrom.

9. An assembly of a pneumatic brake booster of a motor vehicle and of a master cylinder, the booster including a casing fixed to a wall separating the passenger compartment from a front compartment of the vehicle, said brake booster having a casing which is divided in leaktight fashion by a movable wall structure into a front chamber permanently connected to a source of partial vacuum and a rear chamber connected selectively to said front chamber or to the atmosphere by a valve means actuated by a control rod, said control rod being capable of bearing, by means of a front face of a plunger on a rear face of a reaction disk secured to a push rod, said master cylinder including a body having an axial bore for receiving at least one piston and formed with at least first and second flanges, said first flange interacting with a first screw and first nut and said second flange interacting with a second screw and second nut for fixing said body with said casing to form a mechanical link between said piston of said master cylinder and said push rod of said booster, characterized in that said push rod of the booster includes at least first and second parts which are joined together to form said mechanical link, said mechanical link having a ball free to rotate in a housing formed on an end of said first part, said ball being capable of rolling over a planar face formed on an end of the second part, said planar face being inclined with respect to an axis of said first part, such that an angle formed between said first and second parts allows a force to be transmitted between said first and second parts and means are provided so that with a rotation of said master cylinder with respect to said booster in response to a rotational torque developed when said master cylinder is pushed substantially breaks the mechanical link between said piston of the master cylinder and said push rod of the booster.

10. The assembly according to claim 9, characterized in that said body of said master cylinder has a front end and a rear end, said second flange being located on said rear end while said front end includes a protuberance extending therefrom.

11. The assembly according to claim 9, characterized in that said first flange of said master cylinder is situated outside the casing of the booster and said second flange of said master cylinder is situated inside the casing of the booster.

12. An assembly of a pneumatic brake booster of a motor vehicle and of a master cylinder, the booster including a casing fixed to a wall separating the passenger compartment from a front compartment of the vehicle, said brake booster having a casing which is divided in leaktight fashion by a movable wall structure into a front chamber permanently connected to a source of partial vacuum and a rear chamber connected selectively to said front chamber or to the atmosphere by a valve means actuated by a control rod, said control rod being capable of bearing, by means of a front face of a plunger on a rear face of a reaction disk secured to a push rod, said master cylinder including a body having an axial bore for receiving at least one piston and formed with at least first and second flanges, said first flange interacting with a first screw and first nut and said second flange interacting with a second screw and second nut for fixing said body with said casing to form a mechanical link between said piston of said master cylinder and said push rod of said booster, characterized in that said push rod of the booster includes at least first and second parts which are joined together to form said mechanical link, said first flange of said master cylinder is situated outside the casing of the booster and said second flange of said master cylinder is situated inside the casing of the booster and means are provided so that with a rotation of said master cylinder with respect to said booster in response to a rotational torque developed when said master cylinder is pushed substantially breaks the mechanical link between said piston of the master cylinder and said push rod of the booster.

* * * * *